(12) United States Patent
Dockter et al.

(10) Patent No.: US 10,421,210 B2
(45) Date of Patent: Sep. 24, 2019

(54) WORKPIECE POSITIONING SYSTEM

(71) Applicant: USNR, LLC, Woodland, WA (US)

(72) Inventors: Mike Dockter, Kelso, WA (US); Petri Saastamo, Woodland, WA (US)

(73) Assignee: USNR, LLC, Woodland, WA (US)

( * ) Notice: Subject to any disclaimer, the term of this patent is extended or adjusted under 35 U.S.C. 154(b) by 325 days.

(21) Appl. No.: 15/495,950

(22) Filed: Apr. 24, 2017

(65) Prior Publication Data

US 2017/0225352 A1 Aug. 10, 2017

Related U.S. Application Data

(62) Division of application No. 15/150,005, filed on May 9, 2016, now Pat. No. 9,630,338, which is a division of application No. 14/027,010, filed on Sep. 13, 2013, now Pat. No. 9,358,699.

(60) Provisional application No. 61/714,744, filed on Oct. 17, 2012.

(51) Int. Cl.
| | |
|---|---|
| B27B 31/04 | (2006.01) |
| B27B 31/00 | (2006.01) |
| B27B 25/04 | (2006.01) |
| B27B 25/00 | (2006.01) |
| B27B 25/02 | (2006.01) |
| B27B 25/06 | (2006.01) |
| B27M 1/08 | (2006.01) |

(52) U.S. Cl.
CPC .............. *B27B 31/04* (2013.01); *B27B 25/00* (2013.01); *B27B 25/02* (2013.01); *B27B 25/04* (2013.01); *B27B 25/06* (2013.01); *B27B 31/00* (2013.01); *B27B 31/003* (2013.01); *B27B 31/006* (2013.01); *B27M 1/08* (2013.01); *B65G 2201/0282* (2013.01)

(58) Field of Classification Search
CPC ........... B65G 17/40; B65G 2201/0282; B27B 25/00; B27B 25/02; B27B 25/04; B27B 31/00; B27B 31/003; B27C 1/00; B27C 1/007; B27C 1/08; Y10T 83/647; Y10T 83/2192; Y10T 83/2196; Y10T 83/6608; Y10T 83/6633; B17M 1/08
USPC .... 198/692, 608, 624; 83/79, 112, 155, 156, 83/361, 706, 730; 144/373, 248.5
See application file for complete search history.

(56) References Cited

U.S. PATENT DOCUMENTS

| | | | | |
|---|---|---|---|---|
| 2,839,106 A | * | 6/1958 | Mueller | ................... B27L 1/122 |
| | | | | 144/208.7 |
| 4,009,632 A | * | 3/1977 | Detjen | ................... B27B 15/08 |
| | | | | 144/245.2 |
| 5,368,080 A | * | 11/1994 | Hamel | ................. B23D 59/008 |
| | | | | 144/242.1 |

(Continued)

*Primary Examiner* — James R Bidwell
(74) *Attorney, Agent, or Firm* — Schwabe Williamson & Wyatt, P.C.

(57) ABSTRACT

Embodiments provide a log positioning system configured to transport a log through one or more chipper/profiler modules to produce a cant with four chipped/profiled sides. In some embodiments, a log processing system may include an infeed, a positioning feed module downstream of the infeed, and one or more chipper/profiler modules disposed proximal to the positioning feed module. The positioning feed module may include a sharp chain coupled to one or more pairs of vertical positioning rolls. The positioning feed module may be selectively skewed, slewed, and/or tilted to match the vertical and angular orientation of the infeed.

19 Claims, 8 Drawing Sheets

(56) References Cited

U.S. PATENT DOCUMENTS

| | | | | |
|---|---|---|---|---|
| 5,676,238 A * | 10/1997 | Saastamo | ................ | B27B 25/02 198/502.2 |
| 6,142,050 A * | 11/2000 | Miki | ........................ | B26D 7/01 83/155 |
| 6,176,283 B1 * | 1/2001 | Knerr | ...................... | B27B 25/02 144/242.1 |
| 6,213,176 B1 * | 4/2001 | Wolf | ........................ | B27B 29/06 144/2.1 |
| 6,216,756 B1 * | 4/2001 | Mason | ................. | B27B 31/003 144/246.2 |
| 6,325,119 B1 * | 12/2001 | Wolf | ........................ | B27B 15/08 144/242.1 |
| 7,007,729 B1 * | 3/2006 | Landers | .................. | B27B 31/00 144/215.2 |
| 2006/0144471 A1 * | 7/2006 | Levesque | .............. | B27L 11/007 144/373 |
| 2013/0048471 A1 * | 2/2013 | Capps, Jr. | ............... | B65G 15/58 198/692 |

* cited by examiner

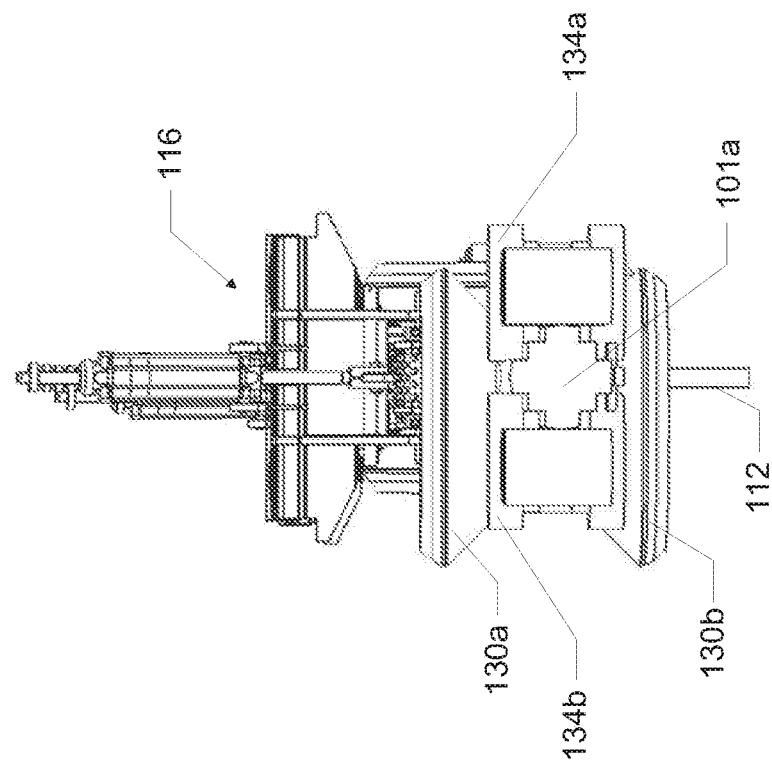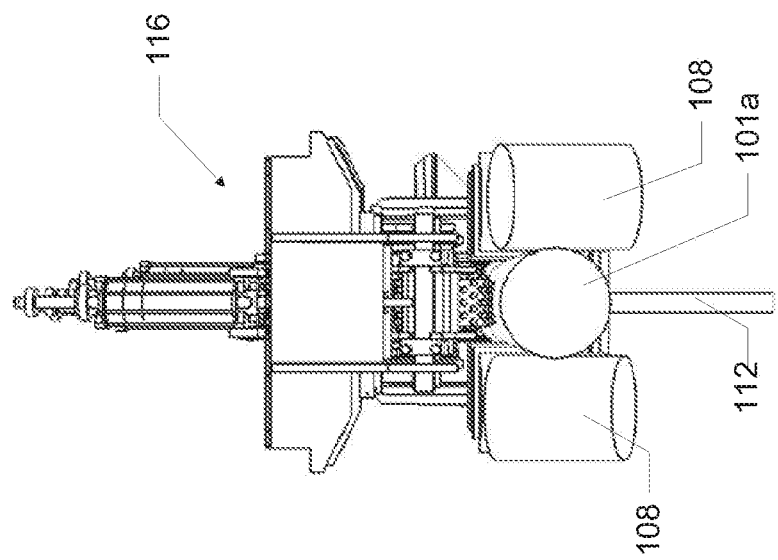

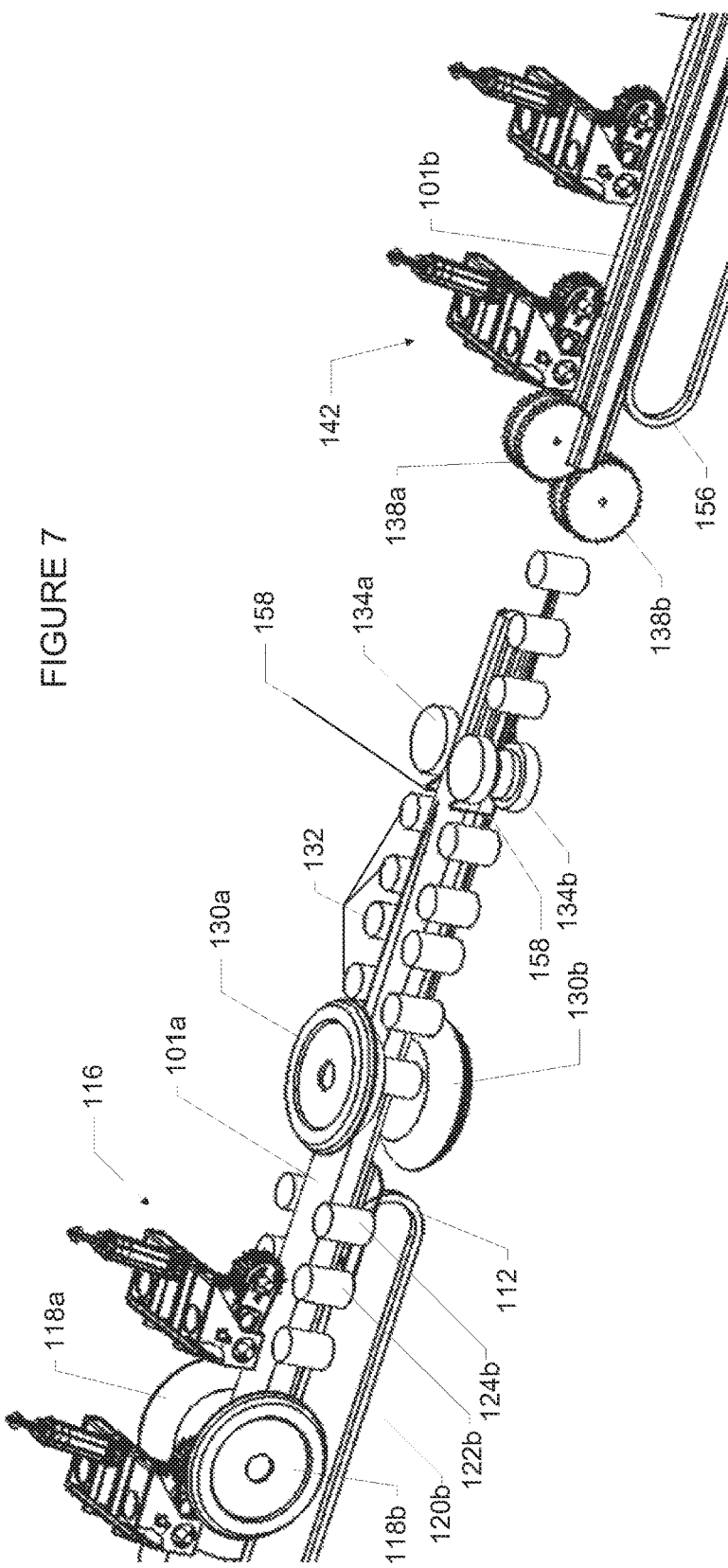

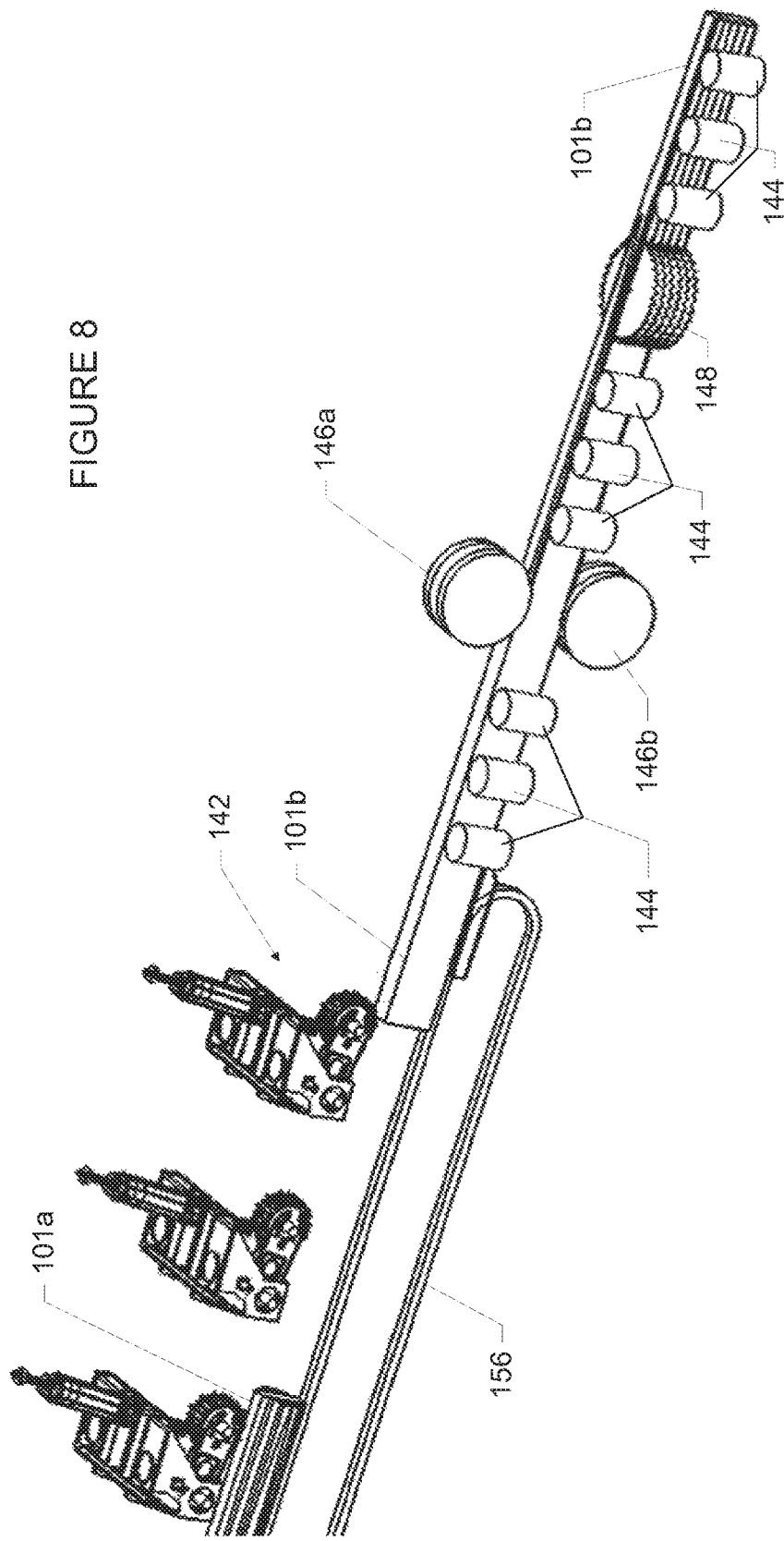

WORKPIECE POSITIONING SYSTEM

CROSS REFERENCE TO RELATED APPLICATION

The present application is a division of U.S. patent application Ser. No. 15/150,005 filed May 9, 2016, which is a division of U.S. patent application Ser. No. 14/027,010 filed Sep. 13, 2013, which claims priority to U.S. Provisional Patent Application No. 61/714,744 filed Oct. 17, 2012, titled "WORKPIECE POSITIONING SYSTEM," the entire disclosures of which are incorporated by reference in their entireties.

TECHNICAL FIELD

Embodiments herein relate to the field of lumber processing, and, more specifically, to system, methods, and apparatuses for positioning workpieces such as logs and cants.

BACKGROUND

Chipper canters are used in some sawmills to process logs, or blocks, into flitches, cants and boards. A chipper canter transforms logs into cants by removing outer portions of wood from two or four sides of the log. However, force applied against the log by the chip heads may cause the log to shift on the conveyor, which can result in inaccurate positioning of the log and sub-optimal chipping/sawing. In addition, the curvature of some logs can present challenges to accurate chipping and sawing.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 5a-5b illustrate front and rear elevational views, respectively, of the components shown in FIG. 4;

FIGS. 7 and 8 illustrate additional details of the log processing system of FIG. 1, all in accordance with various embodiments.

DETAILED DESCRIPTION OF DISCLOSED EMBODIMENTS

Figure 1:
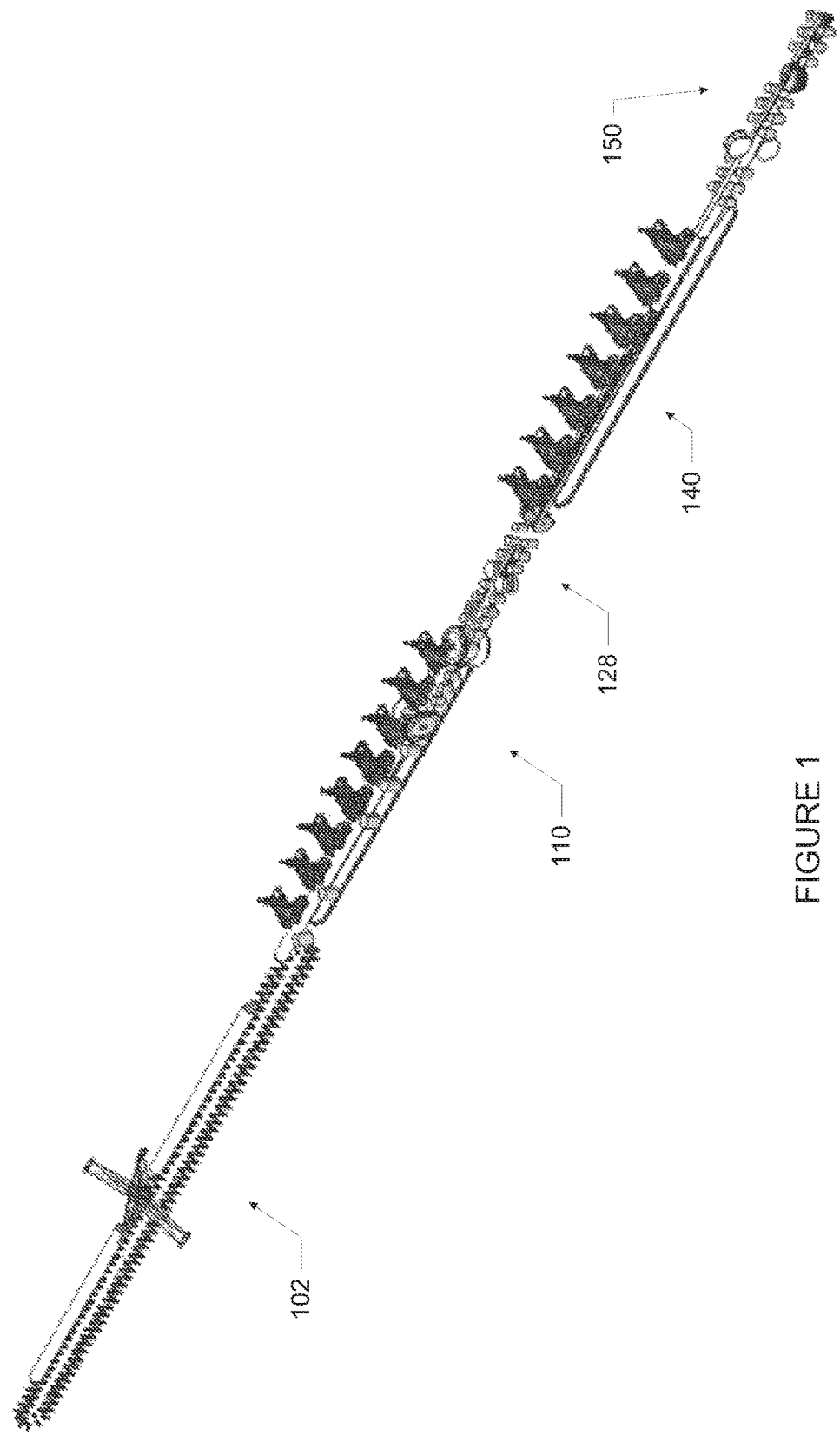
FIG. 1 illustrates a perspective view of a log processing system.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In exemplary embodiments, a computing device may be endowed with one or more components of the disclosed apparatuses and/or systems and may be employed to perform one or more methods as disclosed herein.

Embodiments herein provide systems, apparatuses, and methods for positioning a workpiece, such as a log/cant. Log processing systems as described herein may have a shorter length than typical existing primary log lines and/or provide improved workpiece positioning capabilities.

As described more fully below, a log positioning system may be configured to transport a log through one or more chipper/profiler modules to produce a cant with four chipped/profiled sides. In some embodiments, a log processing system may include an infeed, a positioning feed module downstream of the infeed, and one or more chipper/profiler modules disposed proximal to the positioning feed module. The positioning feed module may include a sharp chain coupled to one or more pairs of vertical positioning rolls. The positioning feed module may be selectively skewed, slewed, and/or tilted to match the vertical and angular orientation of the infeed.

The infeed may be configured to convey a log in a first direction generally parallel to a longitudinal axis of the log, and to position and/or tilt the log. The positioning feed module may adjust or maintain the optimized position of the log while feeding the log into a first pair of chip heads. The first pair of chip heads may be configured to chip vertical flat faces on the sides of the log. As the leading end of the workpiece (now a cant) exits the first pair of chip heads, the bottom of the workpiece is engaged by the sharp chain of the positioning feed module. The vertical rolls of the positioning feed module contact the chipped vertical faces of the workpiece and continue to drive the workpiece in the first direction toward a second pair of chip heads. The sharp chain and vertical rolls of the positioning feed module may be selectively skewed, slewed, tilted, and/or vertically repositioned in concert to position the workpiece for chipping by the second set of chip heads. The second set of chippers may chip flat faces on the top and bottom of the workpiece.

In some embodiments, an optimizing scanner system may be provided upstream of the positioning feed module (e.g., positioned along the infeed). A log turner may be positioned along the infeed and/or the positioning feed module upstream of the first pair of chip heads. As a log is conveyed along the infeed, the optimizing scanner system may scan the log and determine an optimized rotational position and optimized cutting solution. The log turner may be controlled, directly or indirectly, by the optimizing scanner system to rotate the log optimized rotational position before the log is engaged by the sharp chain and processed by the first and second pairs of chip heads.

Optionally, one or more profiler and/or saw units may be provided downstream of the second pair of chippers. In one embodiment of a log processing system, a first pair of profilers is positioned downstream of the second pair of chip heads. A first saw module, such as a horizontal arbor saw, is positioned downstream of the first pair of profilers. The first pair of profilers may engage and profile the vertical sides of the workpiece, and the first saw module may subsequently cut side boards from the profiled workpiece. A second set of profilers may be provided downstream of the first saw module. The second set of profilers may profile the top and/or bottom of the workpiece. A second saw module, such as a vertical arbor saw, may be provided downstream of the second set of profilers. The second saw module may cut the workpiece into two or more pieces (e.g., boards).

Figure 2A:
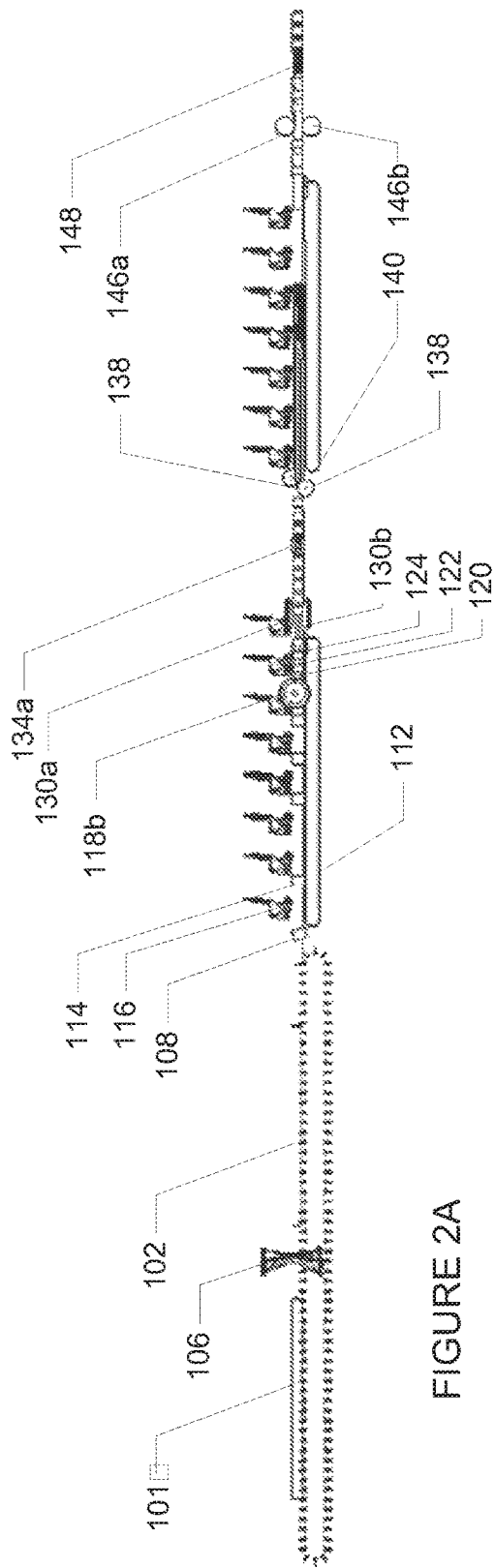
FIGS. 2a-2b illustrate side and top views, respectively, of the log processing system of FIG. 1.
Figure 2B:
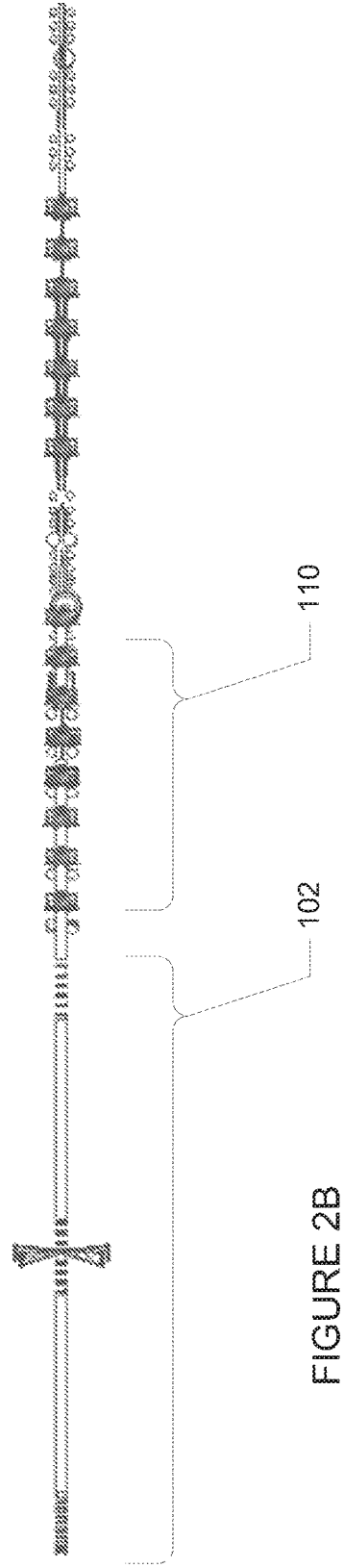

FIG. 1 illustrates a perspective view of a log processing system 100. FIGS. 2a-2b illustrate side and top views, respectively, of log processing system 100. Referring first to FIG. 1, log processing system 100 may include one or more of an infeed 102, a positioning feed module 110, a first profile/saw section 128, a second conveyor 140, and a second profile/saw section 150.

Referring now to FIGS. 2a-b, infeed 102 may include any type of conveyor known in the art for transporting logs, such as a flighted chain conveyor. In a particular embodiment, the conveyor is selectively operable to skew, slew, tilt, and/or vertically reposition a workpiece, such as a log/cant (101a, 101b) on the conveyor. An optimizing scanner 106 may be provided along infeed 102. Optimizing scanner 106 may include a computing system communicatively coupled to one or more sensors positioned along the conveyor of infeed 102. Optionally, optimizing scanner 106 may further include one or more additional sensors arranged downstream of the conveyor and/or downstream of infeed 102. Optimizing scanner 106 may be configured to scan a workpiece and determine an optimized rotational position for the workpiece. In addition, optimizing scanner 106 may be configured to determine an optimized cutting solution and/or optimized cut pattern for the workpiece. In some embodiments, log processing line 100 may include two separate scanners, with the first scanner configured to provide rotation correction and the second scanner configured to provide turn detection (e.g., measure the actual log rotation against what was predicted) and/or source quality inspection (e.g., measure the horizontal position of the log against what was predicted).

A log turner 108 may be positioned proximal to infeed 102. In some embodiments, log turner 108 may be positioned between infeed 102 and positioning feed module 110. Log turner 108 may include knuckle turner rolls that will handle logs up to 18" diameter. Alternatively, log turner 108 may be a reciprocating log turner configured to accommodate logs of greater diameter (e.g., up to 30"). Log turner 108 may turn the log to the optimized rotational position determined by optimizing scanner 106. Optionally, one or more of the sensors of optimizing scanner 106 may be positioned to monitor the position of the log before, after, and/or during the turn. For example, a first group of sensors positioned along infeed 102 may be used to scan the log for calculation of optimized rotational position, and the first group of sensors and/or a second group of sensors positioned downstream of the first group of sensors may be used to monitor the rotational position of the log. Optimizing scanner 106 may be configured to detect the actual rotational position of the log and to calculate a difference between the actual position and the optimized rotational position and/or predicted rotational position. Based on the calculated difference, optimizing scanner 106 may generate one or more commands to cause log turner 108 to correct the rotational position of the log (e.g., to continue the turn or initiate an additional turn). Optimizing scanner 106 may also measure the horizontal position of the log against a predicted horizontal position and calculate a difference between the actual horizontal position and the predicted horizontal position. Based on the calculated difference(s), optimizing scanner 106 may generate one or more commands to adjust positioning feed module 110 and/or a downstream cutting tool (e.g., chip heads and/or a saw) to offset the calculated difference(s).

Figure 3:
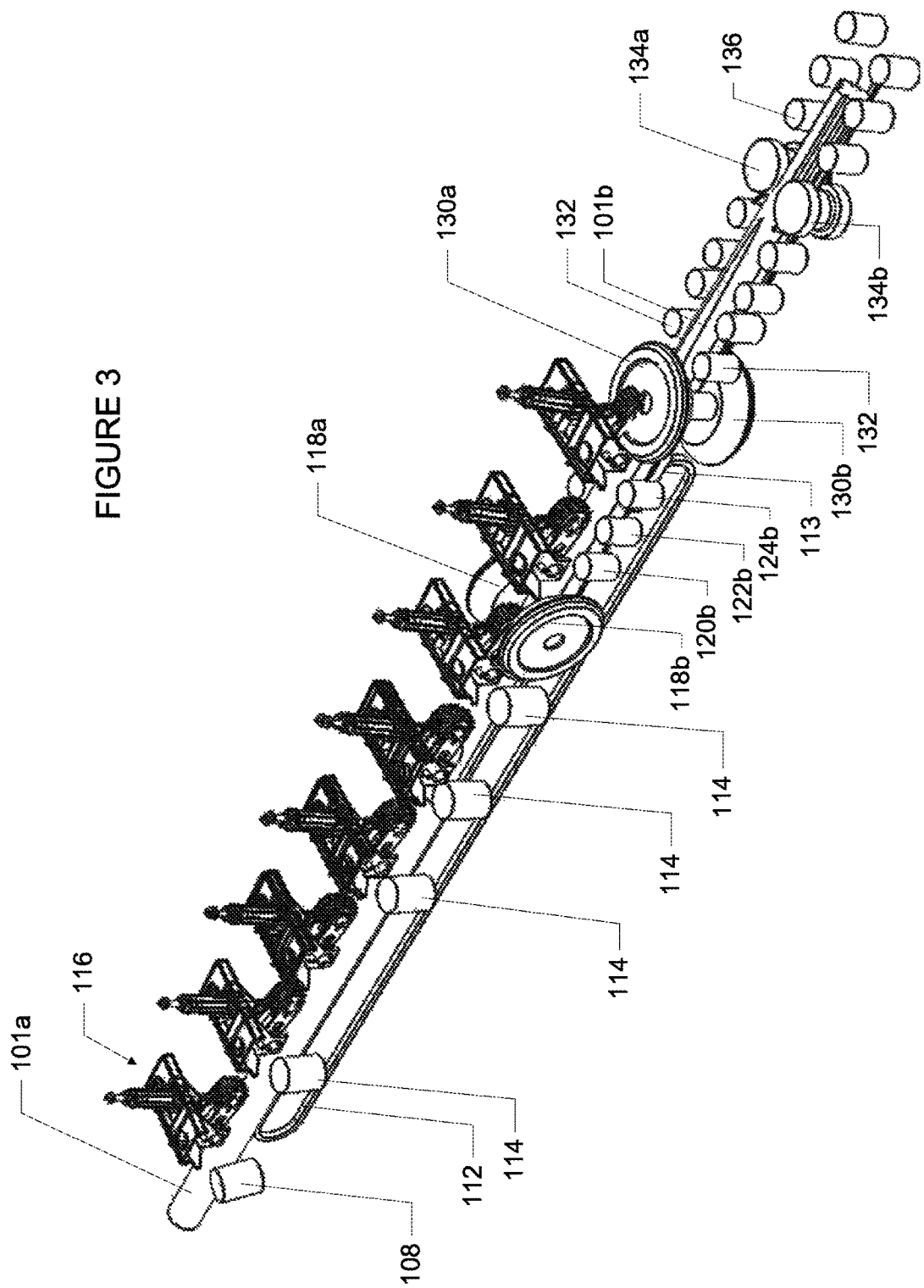
FIG. 3 illustrates a positioning feed module and other components of the log processing system of FIG. 1.
Figure 4:
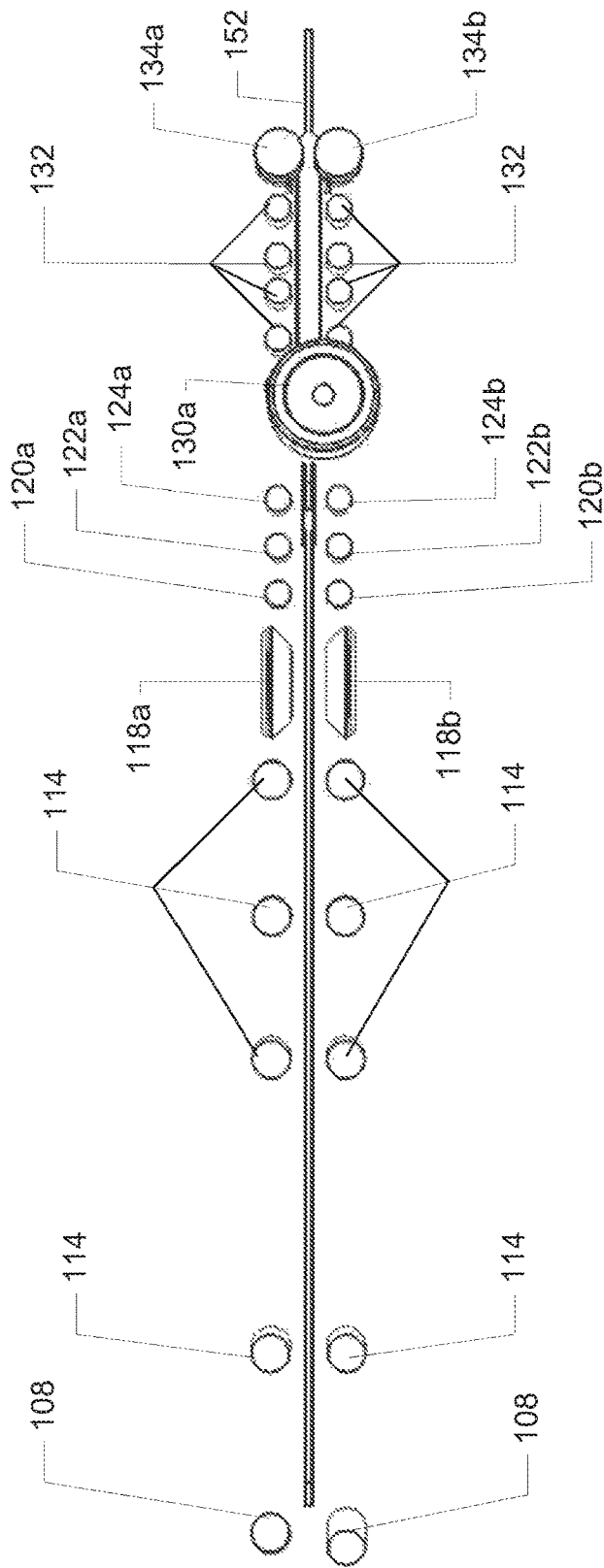
FIG. 4 illustrates a simplified plan view of a positioning feed module.

Positioning feed module 110 may be disposed downstream of infeed 102 and/or log turner 108. FIGS. 3 and 4 illustrate additional details of positioning feed module 110 and additional components of log processing line 100. As best shown in FIG. 3, positioning feed module 110 may include a sharp chain 112 operatively coupled to one or more pairs of vertical feed rolls 120 (vertical feed rolls 120a, 120b), 122 (vertical feed rolls 122a, 122b), and 124 (vertical feed rolls 124a, 124b). Once the log has been turned, log turner 108 may deposit the log onto sharp chain 112. Sharp chain 112 and vertical feed rolls 120, 122, and 124 may be selectively repositioned in unison to match the vertical orientation and angle of infeed 102.

A first pair of chip heads 118a and 118b may be arranged on opposite sides of sharp chain 112. Chip heads 118a and 118b may be side chip heads configured to chip vertical faces along the lateral sides of a workpiece. A second pair of chip heads 130a and 130b may be positioned downstream of chip heads 118a/118b (e.g., at or near the terminal end of positioning feed module 110). Chip heads 130a and 130b may be top and bottom chip heads, respectively, configured to chip horizontal faces along the top and bottom of the workpiece. Chip heads 130a and 130b may be vertically aligned, with chip head 130a positioned above chip head 130b. Chip head 130b may be a fixed-position chip head, and chip head 130a may be vertically repositionable relative to chip head 130b to accommodate various workpiece sizes and cut patterns. Alternatively, chip head 130a may be a fixed-position chip head and chip head 130b may be vertically repositionable. As still another alternative, chip heads 130a and 130b may both be vertically repositionable. In some embodiments, some or all of chip heads 118a, 118b, 130a, and 130b are conical chip heads configured to create a smooth surface finish on the cant.

Sharp chain 112 may extend between the first pair of chip heads 118a/118b. In some embodiments, sharp chain 112 may also extend between the second pair of chip heads 130a/130b. Alternatively, chip heads 130a/130b may be positioned downstream of sharp chain 112. Vertical feed rolls 120, 122, and 124 may move vertically/laterally with the chain to maintain the vertical lift, slew and skew of the log as it enters the second pair of chip heads 130a/130b.

One or more overhead press roll assemblies 116 may be provided along some or all of the length of sharp chain 112 to help maintain the workpiece in a desired position. Centering feed rolls 114 may be positioned along sharp chain 112 upstream of the first pair of chip heads. Likewise, additional vertical feed rolls 132 may be positioned downstream of the second pair of chip heads 130a/130b. In contrast to vertical feed rolls 120, 122, and 124, vertical feed rolls 132 may have fixed positions, such that they are not repositioned in unison with sharp chain 112.

As the workpiece travels into the first pair of chip heads 118a/118b, the workpiece may be maintained in position by overhead press rolls 116, sharp chain 112, and centering feed rolls 114. The first pair of chip heads 118a/118b may create vertical chipped faces that are engaged by vertical feed rolls 120, 122, and 124 to guide the workpiece into the second pair of chip heads 130a/130b. Sharp chain 112 and vertical feed rolls 120, 122, and 124 may be selectively repositioned to slew, skew, lift and/or tilt the workpiece to create the desired opening face with chip head 130b. The workpiece may be stabilized by the downward force exerted by the first pair of chip heads 118a/118b chipping down into the workpiece. In addition, the upstream chip heads 118a/118b may provide lateral support to the workpiece to counteract the lateral force exerted by the second pair of chip heads 130a/130b, resulting in improved workpiece stability and positioning. Optionally, one or more guides may be positioned upstream of the second pair of chip heads 130a/130b to help guide the workpieces into the chip heads.

Figure 6:
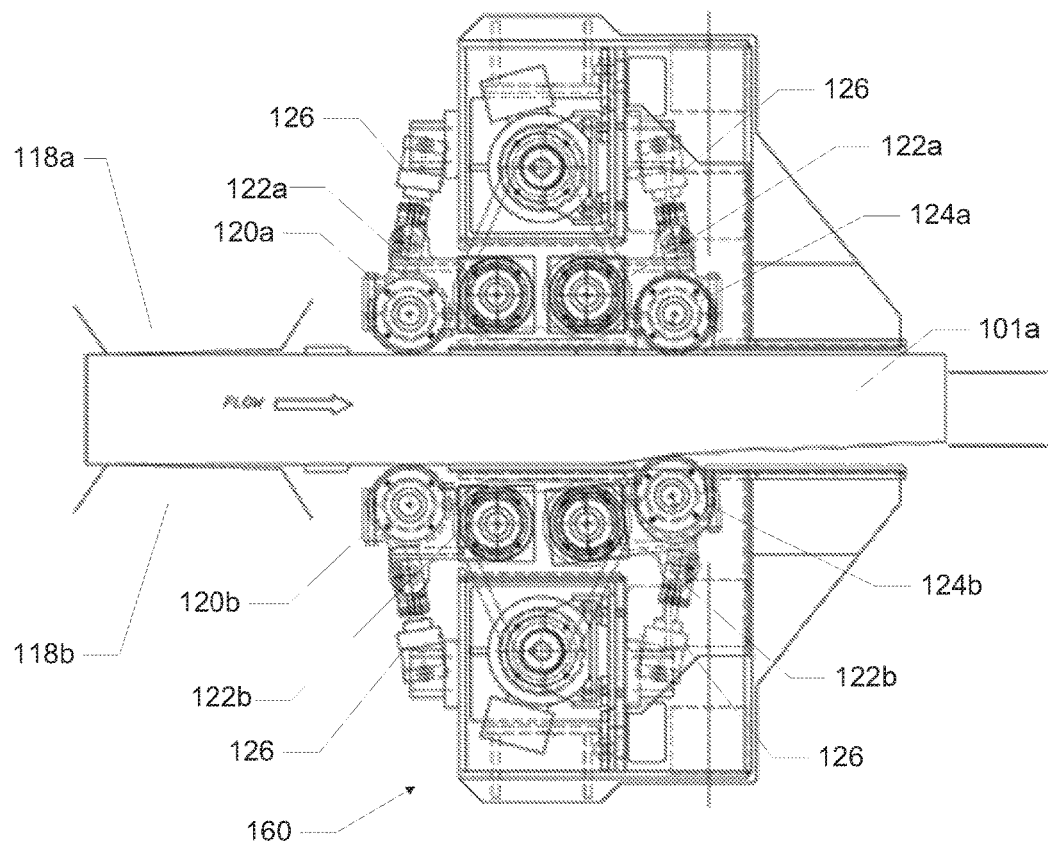
FIG. 6 illustrates a schematic plan view of a positioning feed module carriage.

The positioning feed module 110 may include a carriage 160, illustrated in FIG. 6. Carriage 160 may include two sides, one on each side of sharp chain 112, and a rail guide system that facilitates in/out and up/down shift of the two sides relative to sharp chain 112 to set the desired cant width. This may allow carriage 160 to be adjusted to accommodate different cant widths. In some embodiments, carriage 160 may include separate carriages on each side of sharp chain 112. Carriage 160 may support the pairs of vertical feed rolls 120, 122, and 124, and actuators 126. Vertical feed rolls 122 may remain in a fixed position with respect to carriage 160. In contrast, vertical feed rolls 120 and 124 may be selectively articulated/repositioned relative to carriage 160 by actuators 126 (e.g., air/hydraulic cylinders, linear positioners, etc.). Optionally, missed face logic may be employed, such that an actuator 126 is extended only when no chipped face is present at the corresponding vertical positioning roll (see e.g., FIG. 6, vertical positioning roll 124b extended by corresponding actuator 126 where chipped face is absent). This may allow the opposite side of the workpiece to be chipped with greater accuracy. Optionally, some or all of the vertical feed rolls 120, 122, and 124 may be equipped with roll scrapers to keep the knurl clean.

A centerline chain drive and chain support may be coupled to sharp chain 112. In some embodiments, the chain drive may be manufactured from polyester. A cylinder may be configured to lift the vertical feed rolls 120, 122, and 124 and the outfeed end of sharp chain 112 to maintain the lift/slew/skew of the workpiece as it travels into the second pair of chip heads 130a/130b. Knife edge support bars (e.g., support 113) may be provided on each side of sharp chain 112 to support the workpiece between the downstream end of sharp chain 112 (e.g., at a head sprocket of the sharp chain) and chip head 130b.

A first profile/saw section 128 may be positioned downstream of the second pair of chip heads 130a/130b. First profile/saw section 128 may include a first pair of profiling heads 134a and 134b, vertical feed rolls 136, and a skid bar 152 (see FIGS. 4 and 7). Optionally, guides 158 may also be provided proximal to the first pair of profiling heads (FIG. 7). Profiling heads 134a and 134b may be configured to profile the vertical sides of the workpiece. In the illustrated example, each of profiling heads 134a and 134b are four-stepped profiling heads that create eight separate side board notches on the sides of the workpiece (see e.g., FIG. 5b). However, this example is not intended to be limiting, and profiling heads 134a and 134b may have any suitable configuration or number of steps. Profiling heads 134a and 134b may slide up and down on vertical splined arbors. Profiling heads 134a and 134b may be driven by drive motors (e.g., 200 hp drive motors). In some embodiments, the chain drive may be manufactured from polyester. Profiling heads 134a and 134b may be supported on a carriage that tilts to accommodate skewing the side boards.

After processing by the second pair of chip heads 130a/130b, the workpiece may proceed along skid bar 152 (FIG. 4) to profiling heads 134a/134b. Vertical feedrolls 132 positioned upstream of the profiling heads and additional vertical feedrolls positioned downstream of the profiling heads may maintain the workpiece in position (see e.g., FIG. 7). A first saw assembly 138 may be provided downstream of the profiling heads. First saw assembly 138 may include a band saw, an arbor saw, or any other suitable type of saw. For example, as illustrated, first saw assembly 138 may include one or more horizontal arbor saws 138a, 138b positionable to saw one or more side boards from the workpiece.

In some embodiments, first saw assembly 138 may include a quad arbor sawbox with a shifting saw carriage on each side and fitted with fixed bottom arbor and tilting top arbor. The top arbor may equalize the depth of cut. Optionally, the top arbor may be actuated with a hydraulic servo valve. First saw assembly 138 may further include a sawguide system with #3 splined sleeves (6" diameter) and a profile rail guide system that allows for in/out shift.

A second conveyor section 140 may be positioned downstream of first saw assembly 138. Second conveyor section 140 may include a conveyor 156 and one or more overhead positioning roll assemblies 142 positioned above conveyor 156. Conveyor 156 may be a sharp chain conveyor. As the workpiece proceeds onto/along second conveyor 156, one or more side boards cut by first saw assembly 138 may be separated or diverted by conventional means for further processing. In some embodiments, side pinch rolls may contain the side boards, and may be actuated with a hydraulic linear positioner.

A second profile/saw section 150 may be positioned downstream of second conveyor 156. As best shown in FIG. 8, second profile/saw section 150 may include additional vertical positioning rolls 144, a second pair of profiling heads 146a/146b, and a second saw assembly 148. As the workpiece proceeds from second conveyor 156 toward profiling heads 146a/146b, vertical positioning rolls 144 may maintain the workpiece in position for profiling. Profiling head 146a may be positioned to profile the top of the workpiece, and profiling head 146b may be positioned to profile the bottom of the workpiece. Additional vertical positioning rolls 144 located downstream of profiling heads 146a/146b may maintain the workpiece in a desired position as the workpiece exits the profiling heads and proceeds toward second saw assembly 148.

Second saw assembly 148 may include a straight-sawing gang. Alternatively, second saw assembly 148 may include a curve-sawing gang. In one embodiment, second saw assembly 148 may include a double vertical arbor gang saw. As the workpiece proceeds through second saw assembly 148, the workpiece may be sawn into boards. Additional vertical positioning rolls located downstream of second saw assembly 148 may help to maintain the workpiece in a desired position for sawing.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An apparatus for positioning a log, comprising:
    a sharp chain configured to convey the log in a direction of flow;
    a carriage coupled with the sharp chain, the carriage having a first portion and a second portion disposed on opposite sides of the sharp chain, one or both of the portions being selectively repositionable toward and away from the sharp chain; and
    a first and a second vertical feed roll rotatably coupled to the first and second portions of the carriage, respectively, and disposed on opposite sides of the sharp chain, wherein the first and second vertical feed rolls are repositionable toward and away from the sharp chain relative to the carriage, and
    wherein the carriage is configured to vertically reposition the sharp chain and the first and second vertical feed rolls in concert to thereby tilt the log while the log is being conveyed on the sharp chain and engaged by one or both of the first and second vertical feed rolls.

2. The apparatus of claim 1, wherein the first and second vertical feed rolls are a first pair of vertical feed rolls, the apparatus further comprising a second pair of vertical feed rolls rotatably coupled to the carriage and disposed on opposite sides of the sharp chain, wherein the vertical feed rolls of the second pair are fixed in position relative to the corresponding portions of the carriage.

3. The apparatus of claim 2, further comprising a third pair of vertical feed rolls rotatably coupled to the carriage and disposed on opposite sides of the sharp chain, wherein the feed rolls of the third pair are repositionable relative to the corresponding portions of the carriage independently of the first pair of vertical feed rolls.

4. The apparatus of claim 3, wherein the third pair of vertical feed rolls includes a third vertical feed roll coupled to the first portion of the carriage and a fourth vertical feed roll coupled to the second portion of the carriage, and the first, second, third, and fourth vertical feed rolls are independently repositionable relative to the carriage.

5. The apparatus of claim 1, further comprising:
    a first actuator connected to the first portion of the carriage and the first vertical feed roll, the first actuator selectively operable to reposition the first vertical feed roll relative to said first portion; and
    a second actuator connected to the second portion of the carriage and the second vertical feed roll, the second actuator selectively operable to reposition the second vertical feed roll relative to said second portion.

6. The apparatus of claim 1, wherein the first and second portions of the carriage are coupled with a rail guide system configured to facilitate lateral repositioning of the first and second portions.

7. The apparatus of claim 1, further comprising a cylinder coupled with an outfeed end of the sharp chain and the first and second vertical feed rolls, wherein the cylinder is actuable to vertically reposition the outfeed end of the sharp chain to thereby tilt the log.

8. The apparatus of claim 1, further comprising a first cutting device positioned along the sharp chain upstream of the first and second vertical feed rolls, wherein the first cutting device is operable to cut a flat face along the log and the first vertical feed roll is operable to engage the flat face.

9. The apparatus of claim 1, further including one or more overhead press roll assemblies operatively coupled with the conveyor.

10. The apparatus of claim 9, further including a second cutting device positioned downstream of the sharp chain and configured to produce a second flat face along the log, the second flat face being transverse to the first flat face.

11. The apparatus of claim 1, further comprising a scanner system operatively coupled with the carriage, the scanner system configured to generate one or more commands to reposition the sharp chain or the vertical feed rolls based at least on a scan of the log.

12. The apparatus of claim 11, further comprising a positioning system upstream of the first and second vertical feed rolls and operatively coupled with the scanner system, wherein the positioning system includes one or more of a conveyor, additional vertical feed rolls, or a log turner, wherein the scanner system is configured to generate one or more commands to cause the positioning device to skew, slew, tilt, and/or rotate the log to a desired position for placement onto the sharp chain.

13. The apparatus of claim 12, wherein the scanner system is further configured to determine a difference between the desired position and an actual position of the log and to generate one or more commands to adjust a position of the sharp chain, the vertical feed rolls, the carriage, or a downstream cutting device to offset said difference.

14. The apparatus of claim 11, further including additional vertical feed rolls disposed along the sharp chain upstream of the first and second vertical feed rolls.

15. The apparatus of claim 14, wherein the scanner system is configured to determine a difference between an actual horizontal position of the log and a predicted horizontal position of the log, and to generate one or more commands to adjust a position of one or more of the vertical feed rolls to offset said difference.

16. The apparatus of claim 11, further comprising a cutting device positioned along or proximal to a downstream end of the sharp chain, wherein the scanner system is further configured to reposition the cutting device based at least on the scan of the log.

17. The apparatus of claim 1, wherein the first and second vertical feed rolls are a first pair of vertical feed rolls, the apparatus further including at least one additional pair of vertical feed rolls disposed along the conveyor on opposite sides of the sharp chain upstream of the first pair of vertical feed rolls.

18. The apparatus of claim 17, wherein the vertical feed rolls of at least one of the pairs are laterally repositionable toward and away from the sharp chain independently of one another.

19. The apparatus of claim 17, wherein at least one of the pairs of vertical feed rolls is laterally repositionable independently of another of the pairs of vertical feed rolls.

* * * * *